(12) United States Patent
DaSilva (10) Patent No.: US 6,901,206 B2
(45) Date of Patent: May 31, 2005

(54) DIGITAL VIDEO RECORDER FILE SYSTEM

(75) Inventor: Daniel R. DaSilva, Clovis, CA (US)

(73) Assignee: Pelco, Clovis, CA (US)

( * ) Notice: Subject to any disclaimer, the term of this patent is extended or adjusted under 35 U.S.C. 154(b) by 295 days.

(21) Appl. No.: 10/305,999

(22) Filed: Nov. 27, 2002

(65) Prior Publication Data

US 2003/0103055 A1 Jun. 5, 2003

Related U.S. Application Data

(60) Provisional application No. 60/334,637, filed on Nov. 30, 2001.

(51) Int. Cl.[7] ................ H04N 5/91; H04N 5/781; G06F 13/00
(52) U.S. Cl. .................. 386/46; 386/45; 386/125; 386/126; 711/171; 711/172
(58) Field of Search .............. 386/45, 125–126; 348/231.1, 231.2; 711/114, 171–172; 725/115, 92, 145

(56) References Cited

U.S. PATENT DOCUMENTS

| | | |
|---|---|---|
| 4,688,106 A | 8/1987 | Keller et al. |
| 5,305,438 A | 4/1994 | MacKay et al. |
| 5,574,662 A | 11/1996 | Windrem et al. |
| 5,590,381 A * | 12/1996 | Mourad ................ 710/52 |
| 5,671,386 A | 9/1997 | Blair et al. |
| 5,732,239 A * | 3/1998 | Tobagi et al. ........... 711/114 |
| 5,805,821 A * | 9/1998 | Saxena et al. ........... 709/231 |
| 5,808,628 A | 9/1998 | Hinson et al. |
| 5,933,834 A * | 8/1999 | Aichelen ............... 707/103 R |
| 6,134,586 A | 10/2000 | Walker |
| 6,144,391 A | 11/2000 | Hinson et al. |
| 6,289,172 B1 | 9/2001 | Windrem et al. |
| 6,292,852 B1 | 9/2001 | Bodo et al. |
| 6,360,058 B1 * | 3/2002 | Yoshimoto et al. ......... 386/116 |
| 6,434,323 B1 | 8/2002 | Hayashi |
| 6,438,319 B1 | 8/2002 | Inoue et al. |

* cited by examiner

*Primary Examiner*—Andrew Faile
*Assistant Examiner*—Jamie Vent
(74) *Attorney, Agent, or Firm*—Gunster, Yoakley & Stewart, P.A.

(57) ABSTRACT

A method for storing video data files upon an array of multiple storage devices on a frame-by-frame basis, with the larger video frames placed upon devices having more free storage capacity, so as to preserve the video data stream continuity, optimize the capacity of the storage devices within the array, minimize or negate the need for any redundant storage, and at the same time, provide a means for easily expanding the overall storage capacity of the array.

8 Claims, 4 Drawing Sheets

Starting Address List
- Disk One: 0, 6, 8
- Disk Two: 0, 3, 6
- Disk Three: 0, 3, 5
- Disk Four: 0, 2, 6
- Disk Five: x
- Disk Six: x

Sequence List
1, 2, 3, 4
8, 7, 6, 5
11, 10, 9, 12

FIG. 4

| lba | DISK ONE (21) | DISK TWO (22) | DISK THREE (23) | DISK FOUR (24) | DISK FIVE (45) | DISK SIX (46) |
|---|---|---|---|---|---|---|
| 0 | Frame 1 | Frame 2 | Frame 3 | Frame 4 | | |
| 1 | • | • | • | • | | |
| 2 | • | • | • | Frame 5 | | |
| 3 | • | Frame 7 | Frame 6 | • | | |
| 4 | • | • | • | • | | |
| 5 | • | • | Frame 9 | • | | |
| 6 | Frame 8 | Frame 10 | • | Frame 12 | | |
| 7 | • | • | • | • | | |
| 8 | Frame 11 | • | • | • | | |
| 9 | • | • | Frame 13 | • | Frame 14 | Frame 15 |
| 10 | Frame 16 | Frame 17 | • | Frame 18 | • | • |
| 11 | • | • | • | • | | |
| 12 | • | • | | • | | |

FIG. 5

Starting Address List
- Disk One: 0, 6, 8, 10
- Disk Two: 0, 3, 5, 10
- Disk Three: 0, 3, 6, 9
- Disk Four: 0, 2, 6, 10
- Disk Five: 9
- Disk Six: 9

Sequence List
1, 2, 3, 4
8, 7, 6, 5
11, 10, 9, 12
16, 17, 13, 18, 14, 15

Starting Address List
| Disk One: | 0, 6, 8 |
| Disk Two: | 0, 3, 5 |
| Disk Three: | 0, 3, 6 |
| Disk Four: | 0, 2, 6 |
| Disk Five: | x |
| Disk Six: | x |

Sequence List
1, 2, 3, 4
6, 8, 7, 5
11, 9, 10, 12

Starting Address List
- Disk One: 0, 6, 8
- Disk Two: 0, 3, 5
- Disk Three: 0, 3, 6
- Disk Four: 0, 2, 6
- Disk Five: x
- Disk Six: x

Sequence List
1, 2, 3, 4
6, 8, 7, 5
11, 9, 10, 12

FIG. 12

DIGITAL VIDEO RECORDER FILE SYSTEM

This application claims the benefit of U.S. Provisional Application No. 60/334,637 filed on Nov. 30, 2001.

BACKGROUND OF THE INVENTION

1. Field of the Invention

The present invention relates to a method for storing data using a digital file system, and more particularly to an efficient method for storing video data upon an array of multiple storage devices.

2. Description of the Prior Art

It is well known that digital video recorders store video data files or streams upon various types of storage devices for future selectable viewing. This video data is made up of numerous individual digital pictures, sometimes referred to as frames. These frames are still pictures, and must be sequentially run at a high speed to create the effect of motion within the video. The file size of each frame varies, depending upon its quality, dimensions, and other characteristics. The combination of these frames into a single video data file or stream results in the video data having a high volume of information. This file size increases with the duration, quality, dimensions, and other characteristics of the video. As a result, video data is generally larger in size than its traditional data file counterparts, even after various compression routines are performed upon it.

Therefore, the methods and requirements for storing and serving video data differ significantly from those of traditional data files. Video data storage devices must have correspondingly larger storage capacities than their traditional data file counterparts. Video data integrity is another concern, since the loss of a single video segment will result in an incomplete, or even nonfunctional, video. This vulnerability is heightened by the sheer size of the video data; since it occupies a greater proportion of the storage device, it is more likely to be affected by any data corruption or physical damage. This also creates a need for a redundant storage system, where a backup of the video data is securely stored for later use in the event that the original file is somehow corrupted or damaged. This backup video data will have approximately the same file size as that of the original file, thus requiring an additional storage device having similar storage capacities. Finally, expanding the free storage capacity (often by purchasing an additional, larger storage device) is a time-consuming process. It often requires copying the entire video data, or a portion of it, to the new storage device. Unlike copying the smaller traditional data files, copying video data may require a significantly longer amount of time, depending upon its size, the transfer speeds between the storage devices, and various other considerations.

The traditional method for storing and serving video data, and one still commonly used with most personal computers today, is to simply store the entire video data, or large segments of it, upon a single storage device. However, there are four significant problems with such a method. First, the storage device must have adequate free storage capacity. Although the capacities of various storage devices have increased over the years, the demand for lengthier, higher quality video has also increased, making this solution infeasible for storing numerous video data concurrently and on a long term basis. Second, using a single storage device is problematic in that failure of the device may potentially destroy all of the video data stored upon it. Even losing a few sectors of the device may result in substantial damage to the video data, depending upon the specific locations of the video data and the damage. Third, data redundancy is often non-existent, or accomplished simply by copying the video data to a separate, similar storage device. This second device is then removed to a safe location, and generally left unused so as to minimize any risk of damage to it. Fourth, if additional storage capacity is required, the video data generally must be copied in its entirety; the only alternatives are to divide the video data into several segments and place the individual segments onto separate storage devices, or compress the video data further. All three of these alternatives require significant amounts of time, with the last alternative also reducing the video quality.

A variety of inventions have been developed to store and serve video data, many of which store the video data upon multiple storage devices. Most of these inventions also provide other features, although those features will not be addressed in the present discussion because they are unrelated to the scope of this invention. For example, U.S. Pat. Nos. 5,574,662 and 6,289,172 disclose storage methods for storing video data upon an array of multiple storage devices. The inventions divide the single video data file or stream into various individual segments, where the size of the segments are based upon the particular video format and hardware characteristics, such as seek times, bandwidth, and I/O data rates. Each segment consists of numerous frames, the exact number depending upon the size of the video segment relative to the overall video data. The inventions then sequentially place the segments upon the different storage devices within the array.

U.S. Pat. No. 5,732,239 discloses a storage method that also divides video data into various segments for storage upon multiple storage devices. The video data is divided into a number of segments proportionate to the number of storage devices within the array. The invention then places the segments upon the different storage devices, either in or out of sequential order. If new storage devices are added to widen the array, the invention reorganizes the segments, either by moving all of the segments, or only those necessary to create a balanced distribution across the entire array.

U.S. Pat. No. 4,688,106 discloses a storage method that divides video data into its individual frames. These frames are then distributed in a parallel fashion upon the various storage devices within the array. However, in writing the frames to the various storage devices, the invention does not take into consideration the different file sizes of the individual frames; instead, the frames are merely written sequentially to the array.

U.S. Pat. No. 6,360,058 discloses a storage method that divides video data into its individual pixels. These pixels are then distributed throughout the array of storage devices in such a manner that no two neighboring pixels are recorded upon the same storage device. This permits the invention to compensate for damaged or lost pixel information by extrapolating such information from the neighboring pixels.

U.S. Pat. Nos. 5,574,662 and 6,289,172 also disclose a method for file redundancy, particularly by making a concurrent, second recording of the video file data upon a separate storage device. This separate storage device is accessed when the invention is unable to read information from one of its primary devices, or where one primary device is reacting slowly to the data requests. U.S. Pat. No. 6,434,323 discloses a second, but similar, method for file redundancy, where the backup data file is stored upon a tape medium. This redundancy method requires the invention to make backups at regular intervals, and upon certain defined events.

Unfortunately, none of the above described devices are particularly suited to the four goals of preserving the video data stream continuity, optimizing the capacity of the storage devices within the array, minimizing or negating the need for any redundant storage, and at the same time, providing a means for easily expanding the overall storage capacity of the array. Most of the above described inventions divide video data into various segments. Each of these segments contains multiple consecutive frames. The loss of any one segment, whether by data corruption or physical damage to a storage device, will cause the video to freeze at, or skip over, the affected location. Depending upon the size of the video segment relative to the overall video data, this malfunction may last anywhere from a few seconds to several minutes. Any video data stored within this affected time interval is unviewable.

Other inventions do not adequately optimize the capacities of the various storage devices, or fail to account for their limitations. For example, the invention of the '106 patent records the individual frames sequentially upon an array of multiple storage devices. It does not consider the fact that the individual frames may be of varying sizes. Thus, the sequential placement of individual frames upon the array will result in several storage devices containing wide discrepancies in free storage capacity; in other words, one storage device will have more information stored upon it than another, even though both devices will contains the same number of frames. This results in a load-balancing problem, in which one device is used more heavily than another, such that the entire video data stream may be delayed while waiting for the overburdened storage device to process a frame request. The invention '058 patent exacerbates this problem by requiring each storage device to process the video data request on a pixel by pixel basis; this process will require more work of each storage device, and may hinder video playback even further due to hardware limitations of the particular storage device.

Furthermore, only the invention of the '239 patent expressly provides a method for redistributing video data upon the addition of new storage devices to an existing array. The '239 invention, in one of its embodiments, takes into consideration the free storage capacity of each storage device. However, since the '239 invention divides its video data into various segments of equal size, this redistribution method consists simply of ensuring that each storage device contains an equal number of video segments, either by redistributing all of the video data segments sequentially upon the widened array, or by shifting only the excess segments onto the new storage devices.

It is therefore desirable to provide a single method for storing video data upon an array of multiple storage devices in such a manner as to preserve video data stream continuity, optimize the capacity of the storage devices within the array, minimize or negate the need for any redundant storage, and at the same time, provide a means for easily expanding the overall storage capacity of the array.

SUMMARY OF THE INVENTION

The present invention provides several methods for satisfying these four goals. The invention first separates the video data into its individual sequential frames. The individual frames are then temporarily grouped into sets, where the number of frames within each set equals the number of storage devices within the array. These frames, one set at a time, are then sorted according to their file sizes, from the largest to the smallest file size. Each set is then recorded upon the array on a frame-by-frame basis, with one frame per storage device, by first sorting each storage device according to the their free storage capacities, then placing the largest frame of the set upon the device having the most free storage capacity at the time of the frame placement, the second largest frame of the set upon the device having the second most free storage capacity, et cetera. The placement of frames having equal file sizes, and the utilization of storage devices having equal free storage capacity, depend upon the particular sorting algorithm used. During placement, the location of each frame is stored within a frame index file. The above described process is repeated with each set of frames until all of the frames have been placed upon the array.

The frame index file provides all of the information necessary to retrieve the individual frames from the array, either sequentially or in random access order. It contains a list indicating the starting logical block address of each frame upon a storage device, organized by the particular storage device, with entries up to the maximum number of storage devices permitted by the invention. It also contains a sequence list indicating the sorted order of each frame within the sets.

New storage devices may be added to the array to further increase its overall storage capacity. Such additions require that the device utilizing the invention first be powered off. The new storage devices are then added to the array. When the device is powered on again, the invention recognizes the additional storage devices, and notes those additions within the frame index file to allow new frames to be stored upon these devices.

This invention preserves the video data continuity in that any damage to a particular storage device has minimal effect upon the overall video data. Specifically, damage to any one section of a storage device affects only the frames stored within that section. Damage to an entire storage device affects only the frames stored upon that device. In either circumstance, only the individual frames stored within the particular section or device are lost; the frames on the other devices remain intact and viewable. The only noticeable effect of such damage upon video playback would be video stuttering at the respective locations of the missing frames; the overall video data stream would remain viewable.

This invention also optimizes the various storage device capacities within the array. As described above, this is done by recording the largest frame upon the individual storage device having the most free storage capacity. Over the course of recording an entire video data file to the array, each storage device within the array should retain substantially equal amounts of free storage capacity. This allows the array to balance the loads of the individual storage devices, such that any one device does not bear a disproportionate burden of providing frame information.

Furthermore, this invention minimizes, or even negates, the need for any redundant or backup storage of the video data file. As described above, the individual frames are stored upon separate storage devices within the array. If one device is damaged in such a manner that the frames contained upon it are lost, this invention still provides for the retrieval of the frames immediately prior to and after the lost frames, since those frames were recorded upon other storage devices within the array. The video data file will remain viewable, albeit with some video stuttering at the locations of the missing frames. However, this stuttering should be slight, or even unnoticeable, because only a single video frame would be lost within each particular time interval.

Finally, this invention permits the simple installation and utilization of additional storage devices. New storage devices may be added to existing arrays simply by having the invention recognize the additional storage devices, and updating the frame index file to begin utilization of those devices. This update immediately expands the size of each set to accommodate the new devices, and allows the immediate use of those devices.

In use, if a video data file having, for example, eight hundred frames is to be placed upon an empty array of four storage devices, the video data file is first divided into two hundred sets of frames, with each set containing four individual sequential frames. The first set of frames is then placed in sequential order upon the array, one frame per storage device. There is no need to place the frames in any modified order because all storage devices within the array have an equal amount of free storage capacity since they were empty to begin with. (Of course, if there were data already on the storage devices, then the storage devices would first be sorted according to available space, as described herein, before storage of the frames thereon.) The locations of the frames are then stored within the frame index file. Beginning with the second set of frames, the array is sorted according to which storage devices have the most to least (or least to most) available storage space thereon. Then, the largest sized frame within the second set is placed onto the storage device having the most free storage capacity, the second largest frame is placed on the storage device having the second most free storage capacity, and so on. Since only one prior set of frames have been placed upon the array, the largest sized frame will be placed upon the storage device containing the smallest frame from the previous set. The second largest frame of the set is placed upon the storage device having the second most free storage capacity. This process continues until the smallest frame of the set is placed upon the storage device having the least free storage capacity. The locations of these frames are then stored within the frame index file. The next set of (four) frames is then placed in the same fashion, sorting and placing according to the frame sizes and the available space on the array. This process continues until all eight hundred frames have been placed upon the array.

In another example, two new storage devices are to be added to the above array for a total of six, and a second video data file having six hundred frames is to be recorded. The invention first recognizes that there are now six storage devices within the array, instead of the previous four. The new video data file is then divided into one hundred sets of frames, with each set containing six individual sequential frames. Since there are data on the array already, the array is sorted for available space, as above. Likewise, the frames are sorted according to their sizes. The frames are then distributed upon the array in the manner described above.

In one embodiment, the sorted frames are stored upon the data storage devices in a sequential order so that, in the event that the same amount of storage capacity is present on two storage devices at the same time, the current frame will be stored on the first of the two storage devices in a sequential order. In another embodiment, the storing of frames will be in reverse order, such that in the event that the same amount of storage capacity is present on two storage devices at the same time, the current frame will be stored on the first of the two storage devices in a reverse-sequential order. In yet another embodiment, the storage of frames may be done in sequential order for a given set, and then in reverse-sequential order for the next set, and back to a sequential order for the following set, and so on, creating a zigzag of storage sequences.

Accordingly, the present invention provides a method for storing video data upon an array of multiple storage devices in such a manner as to preserve the video data stream continuity, optimize the capacity of the storage devices within the array, minimize or negate the need for any redundant storage, and easily expand the overall storage capacity of that array. The separation of the video data file into its individual frames, and the placement of those individual frames upon different storage devices within the array, protects the video data stream continuity from damage to any one storage device, and minimizes or negates the need for a redundant storage system. Furthermore, the placement of each individual frame upon the particular device having the most free storage capacity optimizes the overall capacity of the array, and balances its load. Finally, the usage of a frame index table permits the invention to easily accommodate additional storage devices.

It is therefore a primary object of the present invention to provide a method for storing a video data file upon an array of multiple storage devices in such a manner as to preserve the video data stream continuity.

It is also a primary object of the present invention to provide a method for storing a video data file upon an array of multiple storage devices in such a manner as to optimize the capacity of the storage devices within the array.

It is also a primary object of the present invention to provide a method for storing a video data file upon an array of multiple storage devices in such a manner as to minimize, or negate, the need for any redundant or backup storage of the video data file.

It is also a primary object of the present invention to provide a method for storing a video data file upon an array of multiple storage devices in such a manner as to provide an easy means for increasing the overall storage capacity of the array by increasing the number of storage devices within it.

Additional objects of the invention will be apparent from the detailed description and the claims herein.

DETAILED DESCRIPTION OF A PREFERRED EMBODIMENT

Figure 1:
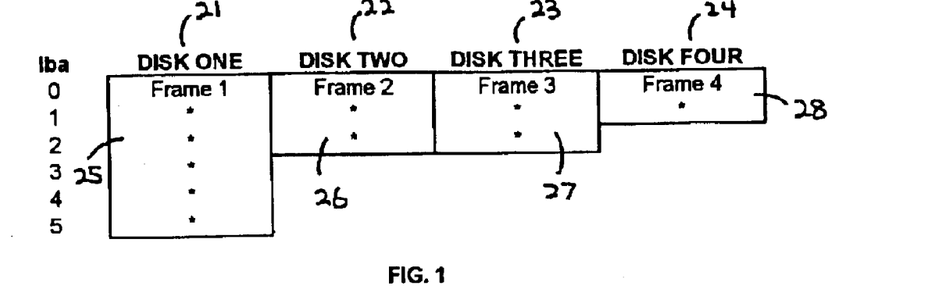
FIG. 1 is an illustration of the organization of the first set of video frames according to the present invention, utilizing a sequential sorting and placement routine for the frame file sizes and free storage capacities.

Referring to the drawings wherein like reference characters refer to the same or corresponding structures throughout the several views, FIG. 1 indicates an array of four storage devices, labeled disks one through four, and denoted by the numerals 21 through 24, respectively. For exemplary purposes and without limitation of the appended claims, the illustrations are based on the assumption that the array is capable of supporting a maximum of four storage devices (except for FIGS. 5 and 6), though the actual invention may support any number of predefined storage devices. The logical block addresses (lba) are denoted by the leftmost column of the diagram. For simplicity, each example frame in the illustrations contains one kilobyte of data for each asterisk underneath the frame number (e.g., frame one 25 contains 5 kilobytes of data), it being understood that the frames may actually be of any size.

FIG. 1 shows the status after placing the first set of video frames according to the method of the invention. As described above, the video data file is separated into its individual sequential frames. The frames are then temporarily grouped into sets, where the number of frames within each set equals the number of storage devices within the array; here, each set contains four frames, with the first set containing frames one through four. These frames are then recorded sequentially upon the array, from disk one 21 through disk four 24, on a frame-by-frame basis, such that frame one 25 is recorded upon disk one 21, frame two 26 is recorded upon disk two 22, frame three 27 is recorded upon disk three 23, and frame four 28 is recorded upon disk four 24. This method for placing the first set of video frames on an empty array remains constant, regardless of the particular sorting methods later used upon the second and subsequent sets. However, if the data array does not being in an empty state, then the data array is sorted for every set of frames placed thereon as described below.

Figure 2:
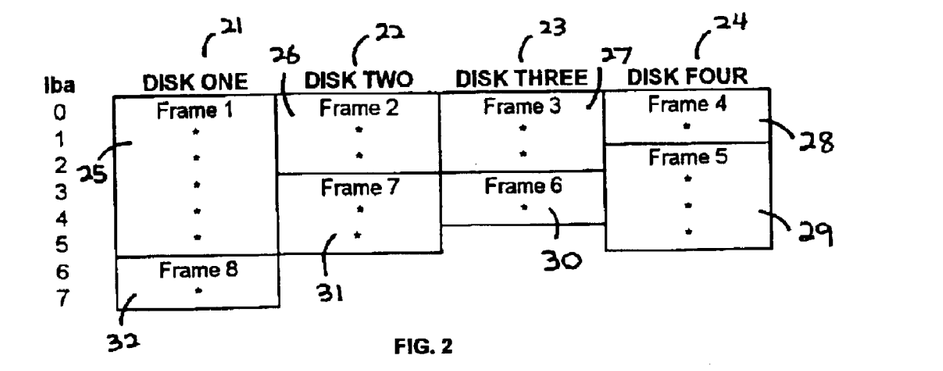
FIG. 2 is an illustration of the organization of the second set of video frames according to the present invention, utilizing a sequential sorting and placement routine for the frame file sizes and free storage capacities.

FIG. 2 shows the status after placing the second set of video frames, consisting of frames five through eight, denoted by the numerals 29 through 32, utilizing a sequential sorting and placement routine. In placing the second set of frames, the invention first sorts the frames according to their file sizes, from the frame having the largest file size to the one having the least. Frames of equal file size are sorted according to their sequential location within the video data. Here, the video frame sorted order is frames five 29, seven 31, six 30, then eight 32. Note that since frames six 30 and eight 32 are of the same file size, frame six 30 is placed prior to frame eight 32 because frame six 30 occurs sequentially prior to frame eight 32 within the video data itself. The devices are then sorted according to their free storage capacities, from the device having the most free storage capacity to the one having the least. Here, the storage device sorted order is disks four 24, two 22, three 23, then one 21. Note that in this illustration, since disks two 22 and three 23 have equal free storage capacities, disk two 22 will be utilized prior to disk three 23 because disk two 22 is ordered prior to disk three 23 within the array (i.e. if a reverse-order embodiment were used, disc three 23 would be utilized before disc two 22). Frame five 29 is then placed upon disk four 24. Frame seven 31 is then placed upon disk two 22. Frame six 30 is then placed upon disk three 23. Finally, frame eight 32 is placed upon disk one 21.

Figure 3:
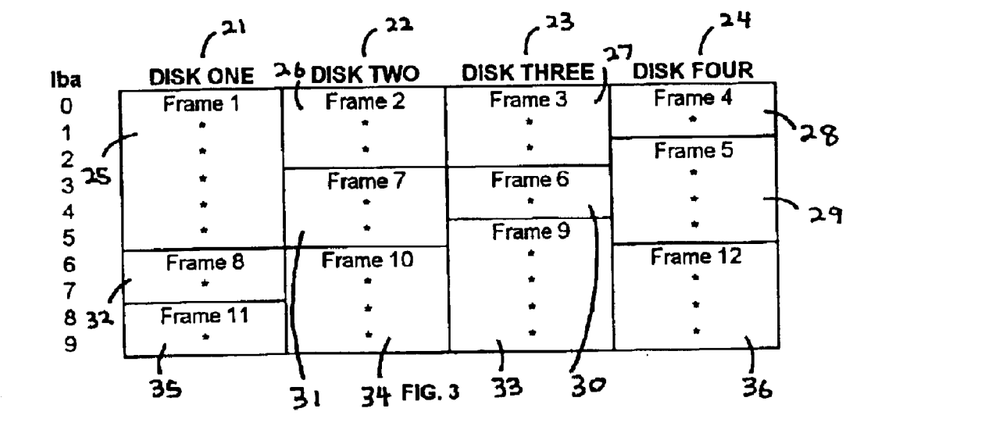
FIG. 3 is an illustration of the organization of the third set of video frames according to the present invention, utilizing a sequential sorting and placement routine for the frame file sizes and free storage capacities.

FIG. 3 shows the status after placing the third set of video frames, consisting of frames nine through twelve, and denoted by the numerals 33 through 36, utilizing a sequential sorting and placement routine, according to the method described in FIG. 2 above. Thus, frame nine 33 is then placed upon disk three 23. Frame ten 34 is then placed upon disk two 22. Frame twelve 36 is then placed upon disk four 24. Finally, frame eleven 35 is placed upon disk one 21.

Figure 4:
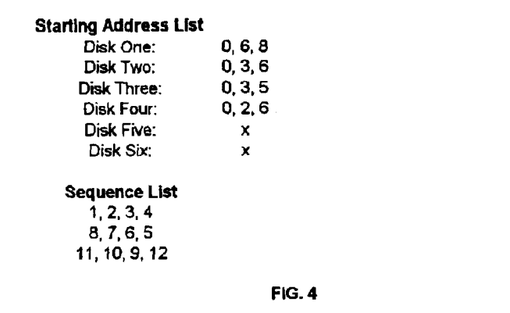
FIG. 4 is an illustration of the frame index file, utilizing a sequential sorting and placement routine for the frame file sizes and free storage capacities, in the particular state after placing the third set of video frames, as depicted in FIG. 3.

FIG. 4 reflects the information contained within the frame index file after the actions described in FIG. 3 above. The starting address list describes the starting logical block address (lba) of each frame upon a particular disk. For the sake of simplicity, these addresses are designated by consecutive numbers, from 0 through 9. According to FIG. 3, frame one 25 begins at lba 0, frame six 30 begins at lba 6, and frame eleven 35 begins at lba 8. Thus, as shown in FIG. 4, the starting address list entry for disk one 21 contains the entries 0, 6 and 8. Similar entries are made for disks two 22 through four 24. The entries for disks five and six contain null characters, here designated by the character "x," because those storage devices do not exist within the array. The sequence list describes the ordering of each frame within a particular set. Here, it can be seen that the first set, consisting of frames one through four, the frames are sorted in the order of one, two, three and four. Similar entries are made for the later sets.

Figure 5:
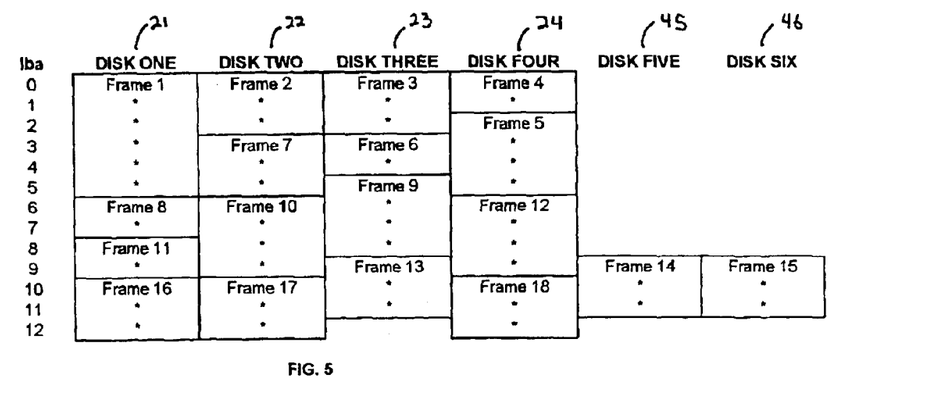
FIG. 5 is an illustration of the organization of a fourth set of video frames according to the present invention, utilizing a sequential sorting and placement routine for the frame file sizes and free storage capacities, after adding two additional storage devices to the array of FIGS. 1–3.

FIG. 5 shows the status after adding two new empty storage devices to the array of FIGS. 1–3, designated as disks five 45 and six 46 in the diagram. These new storage devices are immediately utilized the next time video data is placed upon the array. Specifically, the size of each frame set is increased to correspond with the new width of the array. When the frames are then placed upon the array, the new storage devices are treated as having free storage capacity equal to the old storage device having the most free storage capacity. By way of example, suppose that frame nine 33 was only 3 kilobytes in size, such that it extended from lba 5 to lba 8. Further suppose that another video data file or stream is to be placed upon the array. There would now be six frames within each set, instead of the previous four. The frames within each set are sorted in the above described sequential order. The storage devices are then sorted in the order of most free storage capacity to least. Since disks five 45 and six 46 are new, they are treated as having the same storage capacity as the old device having the most free storage capacity, here, disk three 23. Thus, the storage device sorted order is three 23, five 45, six 46, one 21, two 22, then four 24. Assuming that each frame is three kilobytes in size, the placement of these new frames would be as indicated in FIG. 5.

Figure 6:
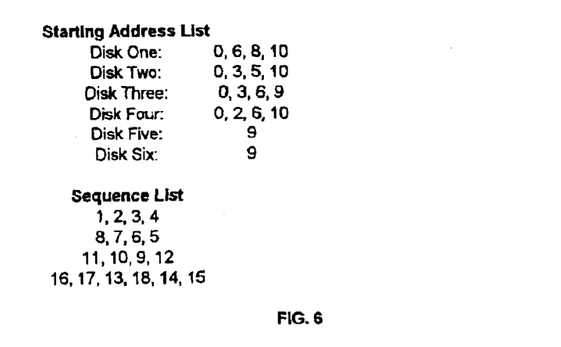
FIG. 6 is an illustration of the frame index file, utilizing a sequential sorting and placement routine for the frame file sizes and free storage capacities, in the particular state after placing the fourth set of video frames, as depicted in FIG. 4.

FIG. 6 reflects the information contained within the frame index file after the actions described in FIG. 5 above. The frame index file is generated in the manner described in FIG. 4 above. However, as indicated by the diagram, the Starting Address List entries for disks five 45 and six 46 no longer contain the null character. Instead, they contain the lba entries for frames fourteen 38 and fifteen 39.

Figure 7:
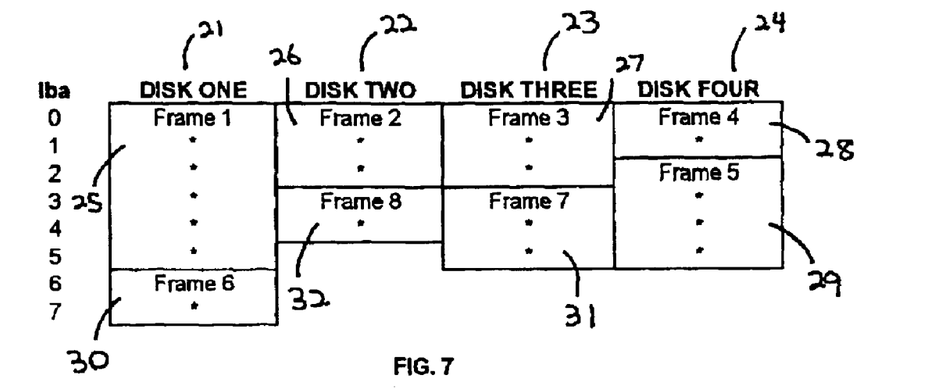
FIG. 7 is an illustration of the organization of the second set of video frames according to the present invention, utilizing a sequential/reverse-sequential (zigzag) sorting and placement routine for the frame file sizes and free storage capacities.

FIG. 7 shows the status after placing the second set of video frames, consisting of frames five through eight, denoted by the numerals 29 through 32, utilizing a sequential/reverse-sequential (zigzag) sorting and placement routine. In placing the second set of frames, the invention first sorts the frames according to their file sizes, from the frame having the largest file size to the one having the least. Frames of equal file size are sorted according to a reverse sequential manner, based upon their sequential location within the video data. Here, the video frame sorted order is frames five 29, seven 31, eight 32, then six 30. Note that since frames six 30 and eight 32 are of the same file size, frame eight 32 is placed prior to frame six 30 because frame six 30 occurs sequentially prior to frame eight 32 within the video data itself. The devices are then sorted according to their free storage capacities, from the device having the most free storage capacity to the one having the least. Here, the storage device sorted order is disks four 24, three 23, two 22, then one 21. Note that since disks two 22 and three 23 have equal free storage capacities, disk three 23 will be utilized prior to disk two 22 because disk two 22 is ordered prior to disk three 23 within the array. Frame five 29 is then placed upon disk four 24. Frame seven 31 is then placed upon disk three 23. Frame eight 32 is then placed upon disk two 22. Finally, frame six 30 is placed upon disk one 21.

Figure 8:
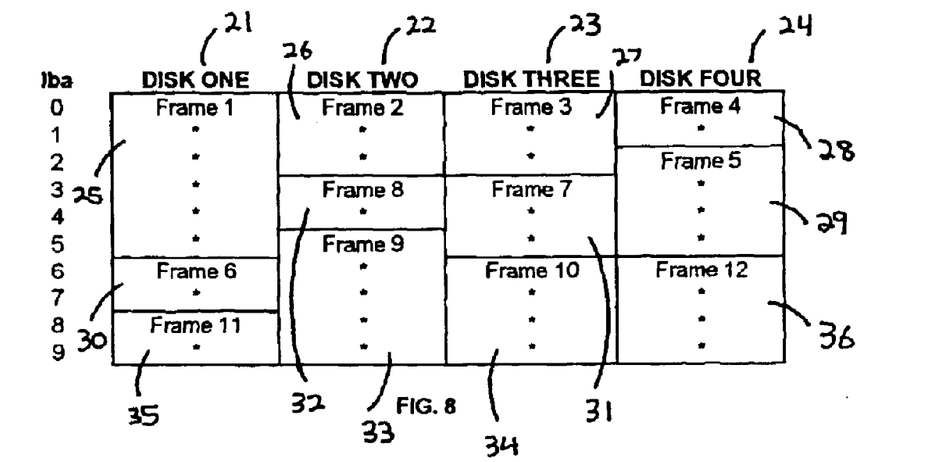
FIG. 8 is an illustration of the organization of the third set of video frames according to the present invention, utilizing a sequential/reverse-sequential sorting and placement routine for the frame file sizes and free storage capacities.

FIG. 8 shows the status after placing the third set of video frames, consisting of frames nine through twelve, and denoted by the numerals 33 through 36, utilizing a sequential/reverse-sequential sorting and placement routine, according to the method described in FIG. 7 above. Thus, frame nine 33 is then placed upon disk two 22. Frame twelve 36 is then placed upon disk four 24. Frame ten 34 is then placed upon disk three 23. Finally, frame eleven 35 is placed upon disk one 21.

Figure 9:
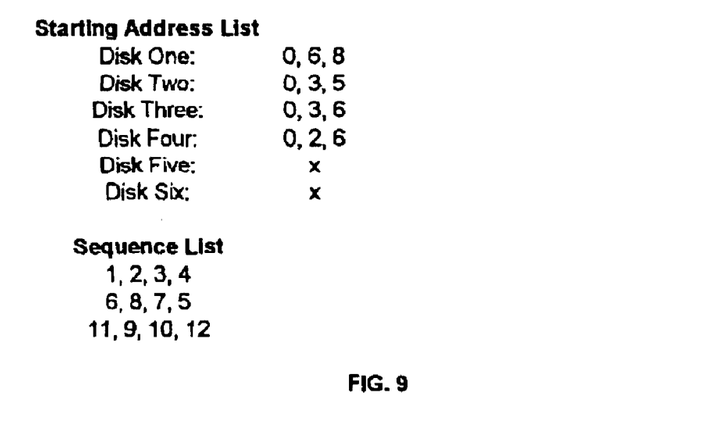
FIG. 9 is an illustration of the frame index file, utilizing a reverse sequential sorting and placement routine for the frame file sizes and free storage capacities, in the particular state after placing the third set of video frames, as depicted in FIG. 8.

FIG. 9 reflects the information contained within the frame index file after the actions described in FIG. 8 above. It is generated in the manner described in FIG. 4 above.

Figure 10:
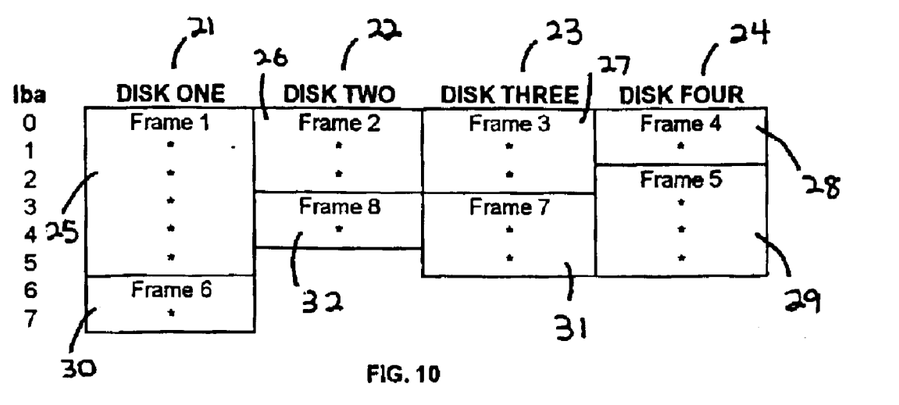
FIG. 10 is an illustration of the organization of the second set of video frames according to the present invention, utilizing a modified sorting and placement routine for the frame file sizes and free storage capacities.

FIG. 10 shows the status after placing the second set of video frames, consisting of frames five through eight, and denoted by the numerals 29 through 32, utilizing a combination sorting and placement routine. This combined sorting and placement routine generally sorts each set in the same sequential manner described in FIG. 2 above. However, for the second set, and every alternate set thereafter (sets four, six, eight, ten, and so on), frames of equal file sizes in the set are sorted in a reverse order, based upon their sequential location within the video data; this is the same sorting function described in FIG. 7 above. Devices having equal free storage capacities are utilized in the same reverse fashion, based upon their ordering within the array; this is also the same sorting function described in FIG. 7 above. Here, the video frame sorted order is frames five 29, seven 31, eight 32, then six 30. Note that since frames six 30 and eight 32 are of the same file size, frame eight 32 is placed prior to frame six 30 because frame six 30 occurs sequentially prior to frame eight 32 within the video data itself. The storage device sorted order is disks four 24, three 23, two 22, then one 21. Note that since disks two 22 and three 23 have equal free storage capacities, disk three 23 will be utilized prior to disk two 22 because disk two 22 is ordered prior to disk three 23 within the array. Frame five 29 is then placed upon disk four 24. Frame seven 31 is then placed upon disk three 23. Frame eight 32 is then placed upon disk two 22. Finally, frame six 30 is placed upon disk one 21.

Figure 11:
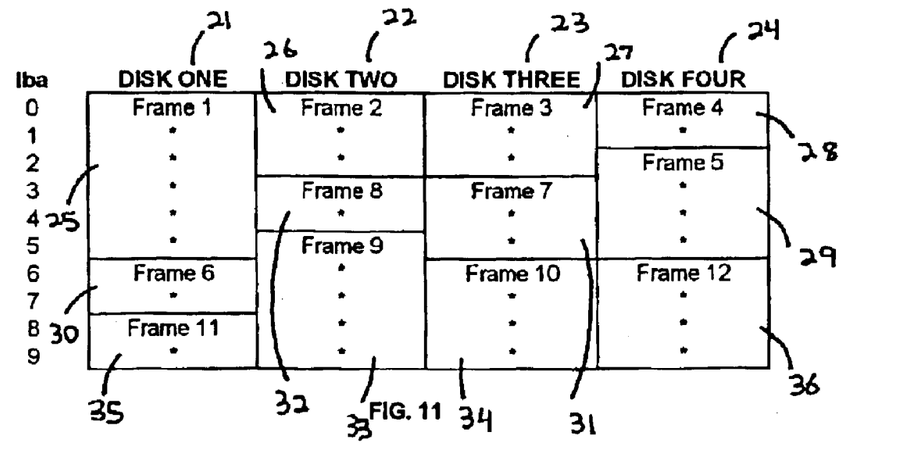
FIG. 11 is an illustration of the organization of the third set of video frames according to the present invention, utilizing a modified sorting and placement routine for the frame file sizes and free storage capacities.

FIG. 11 shows the status after placing the third set of video frames, consisting of frames nine through twelve, and denoted by the numerals 33 through 36, utilizing a combination sorting and placement routine. As stated in the description of FIG. 10 above, the combined sorting and placement routine here generally sorts each set in the same sequential manner described in FIG. 2 above. However, for the third set, and every alternate set thereafter (sets five, seven, nine, twelve, and so on), frames of equal file sizes in the set sets are sorted in order based upon their sequential locations within the video data; this is the same sorting function described in FIG. 2 above. Devices having equal free storage capacity are utilized in the same sequential fashion, based upon their ordering within the array; this is also the same sorting function described in FIG. 3 above. Here, the video frame sorted order is frames nine 33, ten 34, twelve 36, then eleven 35. Note that since frames ten 34 and twelve 36 are of the same file size, frame ten 34 is placed prior to frame twelve 36 because frame ten 34 occurs sequentially prior to frame twelve 36 within the video data itself. The storage device sorted order is disks two 22, three 23, four 24, then one 21. Note that since disks three 23 and four 24 have equal free storage capacities, disk three 23 will be utilized prior to disk four 24 because disk three 23 is ordered prior to disk four 24 within the array. Frame nine 33 is then placed upon disk two 22. Frame ten 34 is then placed upon disk three 23. Frame twelve 36 is then placed upon disk four 24. Finally, frame eleven 35 is placed upon disk one 21.

Figure 12:
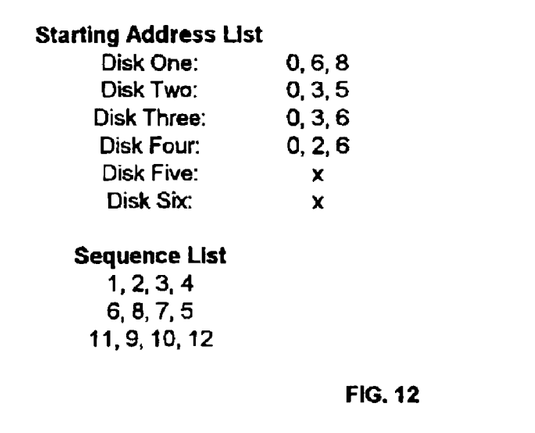
FIG. 12 is an illustration of the frame index file, utilizing a modified sorting and placement routine for the frame file sizes and free storage capacities, in the particular state after placing the third set of video frames, as depicted in FIG. 11.

FIG. 12 reflects the information contained within the frame index file after the actions described in FIG. 11 above. It is generated in the manner described in FIG. 4 above.

To illustrate the ability of this invention to compensate for a damaged storage device, suppose that the state of the array is as depicted in FIGS. 11 and 12. Further suppose that disk one 21 is physically damaged, such that frames one 25, six 30 and eleven 35 are lost. The neighboring frame(s) remain undamaged and retrievable, since they were recorded upon separate storage devices within the array. Thus, the video still contains frames two through five, denoted by the numerals 26 through 29, seven through ten, denoted by the numerals 31 through 34, and twelve 36. Upon playback, the video will begin at frame two 26, and play smoothly through frame five 29. It will then stutter slightly at the lost frame six 30, but continue from frame seven 31 and play smoothly through frame ten 34. It will then stutter again at the lost frame eleven 35, and finally, finish upon frame twelve 36. Since each lost frame represents a single still picture within the entire video data file, the overall effect of these lost frames should be minimal.

It is to appreciated that other sorting algorithms other than those described herein (sequential, reverse-sequential, zigzag) may be utilized, depending upon the characteristics of the data, as well as the particular goals sought.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification. Specifically, it is to be understood that the invention may be performed upon an array containing any number of storage devices, and is not particularly limited to a specific number or range of devices.

What is claimed is:

1. A method for storing video data upon an array of multiple storage devices, comprising the steps of:
   (a) separating said video data into its individual sequential frames;
   (b) grouping said frames into sequential sets, wherein the number of frames within each set equals the number of storage devices within said array;
   (c) sorting said frames within the first set according to their file sizes, in descending order from the frame having the largest file size to the frame having the smallest file size;
   (d) sorting said storage devices according to their free storage capacity, in descending order from the storage device having the most free storage capacity to the storage device having the least storage capacity;
   (e) recording said first set of frames upon said array of multiple storage devices, such that the first sorted frame is recorded upon the first sorted storage device, the second sorted frame is recorded upon the second sorted storage device, and so on, until the last sorted frame of the set is recorded upon the last storage device;
   (f) sorting the frames within the next sequential set according to their file sizes, in descending order from the frame having the largest file size to the frame having the smallest file size;
   (g) sorting the storage devices according to their free storage capacity, in descending order from the storage device having the most free storage capacity to the storage device having the least storage capacity;
   (h) recording said next set of frames upon said array of multiple storage devices, such that the first sorted frame is recorded upon the first sorted storage device, the second sorted frame is recorded upon the second sorted storage device, and so on, until the last sorted frame of the set is recorded upon the last storage device;
   (i) repeating steps (f) through (h) for each of the sequential sets of frames.

2. The method of claim 1 wherein in the sorting of said frames in step (f), if frames of equal size are encountered, the two frames are sorted relative to each other in ascending order according to file size for placement upon the array.

3. The method of claim 1 wherein in the sorting of said devices in step (g), if devices having equal storage capacity are encountered, the two devices are sorted relative to each other in ascending order according to free capacity for storage of the frames.

4. The method of claim 1 wherein in the sorting of said frames in step (f), if frames of equal size are encountered, the two frames are sorted relative to each other in descending order according to file size for placement upon the array.

5. The method of claim 1 wherein in the sorting of said devices in step (g), if devices having equal storage capacity are encountered, the two devices are sorted relative to each other in descending order according to free capacity for storage of the frames.

6. The method of claim 1 wherein in the sorting of said frames in step (f), if frames of equal size are encountered, the two frames are alternatively sorted relative to each other in descending order according to file size, and then in ascending order according to file, size for placement upon the array.

7. The method of claim 1 wherein in the sorting of said devices in step (g), if devices having equal storage capacity are encountered, the two devices are alternatively sorted relative to each other in descending order according to free capacity, and then in ascending order according to free capacity for storage of the frames.

8. The method of claim 1 wherein at least one additional storage device is added to the array and wherein in step (d) said at least one storage device is assigned a free storage capacity that is the same as that of the storage device previously in the array having the most free storage capacity, and is then sorted with the other storage devices of the array according to such free storage capacity, and wherein the number of frames of each set is increased to be equal to the total number of storage devices in the array.

* * * * *